United States Patent
Loesch et al.

(10) Patent No.: US 6,231,668 B1
(45) Date of Patent: *May 15, 2001

(54) METHOD FOR MANUFACTURING A CALIBRATED SCALE IN THE NANOMETER RANGE FOR TECHNICAL DEVICES USED FOR THE HIGH RESOLUTION OR ULTRAHIGH-RESOLUTION IMAGING OF STRUCTURES AND SUCH SCALE

(75) Inventors: Rainer Loesch, Hockenheim; Hartmut Hillmer, Darmstadt; Winfried Schlapp, Weiterstadt; Armin Poecker, Bensheim; Walter Betz, Seeheim-Jugenheim; Rainer Goebel, Mainz, all of (DE)

(73) Assignee: Deutsche Telekom AG, Bonn (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/795,622

(22) Filed: Feb. 6, 1997

(30) Foreign Application Priority Data

Feb. 7, 1996 (DE) ............................................. 196 04 348

(51) Int. Cl.⁷ .................................................... C30B 23/00
(52) U.S. Cl. ............................... 117/89; 117/92; 117/103; 117/105; 117/953; 117/955; 117/954
(58) Field of Search ................................ 147/89, 92, 103, 147/105, 953, 955, 954

(56) References Cited

U.S. PATENT DOCUMENTS

| | | |
|---|---|---|
| 4,088,515 | 5/1978 | Blakesle et al. . |
| 4,793,872 | 12/1988 | Meunier et al. . |

(List continued on next page.)

FOREIGN PATENT DOCUMENTS

| | | |
|---|---|---|
| 38 23 992 | 1/1990 | (DE) . |
| 0 332 329 | 9/1989 | (EP) . |

OTHER PUBLICATIONS

Deckman et al., Microfabrication of molecular scale microstructures, Applied Physics Letters vol. 50 (9) pp. 504–5–06, Mar. 2, 1987.*

Lizunov, V. et al., "Linear and Angular Measurements," 1989 Plenum Publishing Corporation, pp. 283–286.

van der Sluis, P., "Determination of strain in epitaxial semiconductor layers by high–resolution x–ray diffraction," Phys. D: Appl. Phys. 26 (1993), pp. A188–A191.

Thompson, P. et al., "Parametric Investigation of $Si_{1-x}Ge_x$/Si Multiple Quantum Well Growth," J. Appl. Phys. vol. 33 (1994), pp. 2317–2321.

(List continued on next page.)

Primary Examiner—Robert Kunemund
(74) Attorney, Agent, or Firm—Kenyon & Kenyon

(57) ABSTRACT

A method for manufacturing and calibrating a scale in the nanometer range for technical devices which are used for the high-resolution or ultrahigh-resolution imaging of structures, and such a scale. To construct the scale, at least two different crystalline or amorphous materials are used, which, when imaged, are easily distinguished from one another by their contrast. These material layers are deposited using a suitable material deposition method as a heterolayer sequence onto a substrate material. The produced heterolayer sequence is characterized experimentally using an analysis method that is sensitive to the individual layer thicknesses of the heterolayer sequence. The data obtained from the analysis method are evaluated and recorded. The layer structure is exposed by splitting open the heterolayer sequence in the deposition direction. The scale is suited for calibrating technical devices used for scanning electron microscopy, scanning transmission electron microscopy, or scanning probe microscopy (atomic force microscopy, scanning tunneling microscopy).

27 Claims, 5 Drawing Sheets

U.S. PATENT DOCUMENTS

| | | | |
|---|---|---|---|
| 4,835,578 | * 5/1989 | Ohtoshi et al. | 357/4 |
| 5,073,893 | * 12/1991 | Kondou | 372/45 |
| 5,091,767 | 2/1992 | Bean et al. . | |
| 5,166,100 | * 11/1992 | Gossard et al. | 437/228 |
| 5,395,793 | 3/1995 | Charbonneau et al. . | |
| 5,457,727 | 10/1995 | Frijlink . | |
| 5,714,765 | * 2/1998 | Noetzel et al. | 257/17 |

OTHER PUBLICATIONS

Williams, M. et al., "Fabrication of free–standing quantum wells," Appl. Phys. Lett. 61 (11), Sep. 14, 1992, p. 1353.

Yates, M. et al., "Characterization of InP to GaInAs and GaInAs to InP interfaces using tilted cleaved corner TEM," Journal of Crystal Growth 124(1992), pp. 604–609.

Sakuma, Y. et al., "Role of interface strain in atomic layer epitaxy growth kinetics of $In_xGa_{1-x}As$," Journal of Crystal Growth 114 (1991), pp. 31–37.

High–Precision Calibration Samples SEM: MXS BE Series—Data Sheet.

Magnification Reference Standards Data Sheet, SEM: MXS 302CE and MXS 702CE.

Magnification Reference Standards, SEM: CE Series.

"VergöBerungstandards für die Lichtmikroskopie,"Plano.

Technical data sheets from the firms Leitz (Wetzlar) and Zeiss (Oberkochen).

Technical data sheets from the LOT (Darmstadt). Not readily available to applicant, Described in the specification.

Technical data sheets from the firm Plano (Marburg). Not readily available to applicant, Described in the specification.

Speriousu et al., "X–ray Rocking Curve Analysis of Superlattices", 1984, p. 1591 Appl. Phys. 56.

Springer (Quillec), "Structural Characterization of Superlattices by X–ray Diffraction", Proceeding in Physics 13, Les Houches, France.

Baumbach et al., "Characterization of AlGaAs/GaAs–Superlattices and Thin Layes by X–ray Diffraction", 1988, p. 197, Phys. Stat. Sol. (a).

Bartels et al., "X–Ray Diffraction of Multilayers and Superlattices", 1986. p. 539–545, Acta Cryst.

Tagaki, S., A Dynamical Theory of Diffraction for a Distorted Crystal, 1969, p. 1239, J. phys. Soc. Japan.

Hornstra, J et al., "Determination of the Lattices Constant of Epitaxial Layers of III–V–Compounds", 1978, p. 513–517, Journal of Crystal Growth.

Weimann, G., et al., "Two–Dimensional Systems, Heterostructures and Superlattices", 1984, p. 88, Springer Series in Solid–State Sciences, vol. 53, Springer Plublishers, Berlin.

Tsang, W.T., "Progess in Chemical Beam Epitaxy", 1990, p. 1–29, J. of Cryst. Growth,.

Ploog, K., "Growth, Properties and Application", 1980, H.C. Freyhardt), Springer Publishers.

Adomi K., et al, "Molecular Beam Epitaxial Growth of GaAs and Other Compound Semiconductors" Thin Solid Films, 1991, pp. 182–212.

Dingle R. et al., "Confined Carrier Quantum States in Ultrathin Semiconductor Heterostructures", 1975, p. 21, Advances in solid State Physics, vol. XV.

Ando, T. et al., "Electronic properties of two–dimensional systems", 1982, p. 437, Reviews of Modern Physics.

Jonsson, B. et al., "Solving the Schrodinger Equation in Arbitrary Quantum–Well Potential Profiles Using the Transfer Matrix Method", 1990, p. 2025, IEEE J. Quantum Electron.

* cited by examiner

METHOD FOR MANUFACTURING A CALIBRATED SCALE IN THE NANOMETER RANGE FOR TECHNICAL DEVICES USED FOR THE HIGH RESOLUTION OR ULTRAHIGH-RESOLUTION IMAGING OF STRUCTURES AND SUCH SCALE

FIELD OF THE INVENTION

The present invention relates generally to calibrated scales and a method for manufacturing such scales, and more particularly to scales for use for calibrating very sensitive microscopes, such as electron microscopes.

RELATED TECHNOLOGY

The following articles have to do thematically with the present invention and are based on related art.
1. Technical data sheets from the firms Leitz (Wetzlar) and Zeiss (Oberkochen). The technical data sheets include a description of metal patterns in the micrometer range (0.5 $\mu$m to 10 $\mu$m), which are lithographically defined on substrates. When objects are measured in the nanometer range, these patterns can be scaled, it then being necessary, however, to take substantial errors into account.
2. Technical data sheets from the firm LOT (Darmstadt). The technical data sheets from the firm LOT describe patterns that are produced lithographically in semiconductor materials. Numbered among these are, for example, line- or cross-lattice structures in silicon, which can be defined with the help of holographic methods. In this case, the lines are spaced apart by 300 nm or 700 nm;
3. Technical data sheets from the firm Plano (Marburg). The technical data sheets from the firm Plano describe patterns fabricated using electron beam methods and aluminum vapor deposition on silicon substrates. The aluminum tracks produced have a thickness as well as minimal width of 500 nm.

The scales described under numbers 2 and 3 must also be scaled before they can be used in the nanometer range. This has its inherent drawbacks.

The following articles are mentioned as examples of analysis methods based on X-ray diffractometry and are hereby incorporated by reference herein:
1. Appl. Phys., 56(1984), p. 1591. Speriosu, V. S.; Vreeland, T., Jr.: "X-ray Rocking Curve Analysis of Superlattices";
2. Springer, Proceedings in Physics 13, Les Houches, France. Quillec, M.: "Structural Characterization of Superlattices by X-ray Diffraction";
3. Phys. stat. sol. (a), 105(1988), p. 197. Baumbach; Brühl; Pietsch; Terauchi: "Characterization of AlGaAs/GaAs-Superlattices and Thin Layers by X-ray Diffraction".

The following sources contain model calculations, which can be used to evaluate the experimental data of the analysis methods, and are hereby incorporated by reference herein:
1. Acta Cryst., A42(1986), p. 539–545. Bartels, W. J.; Hornstra, J.; Lobeek, D. J.: "X-Ray Diffraction of Multilayers and Superlattices",
2. J. phys. soc. Japan, 26(1969), no. 5, p. 1239 Tagaki, S.: "A Dynamical Theory of Diffraction for a Distorted Crystal";
3. Journal of Crystal Growth, 44(1978), p. 513–517. Hornstra, J.; Bartels, W. J.: "Determination of the Lattice Constant of Epitaxial Layers of III–V-Compounds";

The model equations are based on a formulation published in 1986 (1) for calculating the reflectivities of Bragg reflections, which is based on the Tagaki-Taupin formalism (2) of the dynamic theory of X-ray diffraction, and on a treatise on the lattice constants when working with strained epitaxy layers of III–V semiconductors (3).

Epitaxial methods can be used, such as molecular-beam epitaxy, to deposit semiconductor heterostructures, i.e., layers which vary in composition and thickness, one after another on a semiconductor substrate. Examples of the extensive literature on this subject are:
1. Springer Publishers, Berlin 1984, p. 88. Springer Series in Solid-State Sciences, vol. 53 Weimann, G., et al.: "Two-dimensional Systems, Heterostructures and Superlattices";
2. J. of Cryst. Growth. 105(1990), p. 1–29. Tsang, W. T.: "Progress in Chemical Beam Epitaxy";
3. H. C. Freyhardt (Editor), Springer Publishers 1980. Ploog, K.: "Growth, Properties and Application";
4. Thin Solid Films, 205(1991), pp. 182–212. Adomi K., et al.: "Molecular Beam Epitaxial Growth of GaAs and Other Compound Semiconductors".

These four references are also incorporated by reference herein.

What all the named literature sources on epitaxial methods have in common is that the individual layer thicknesses are able to be determined from the growth rates and from various in-situ control methods, such as RHEED and ellipsometry. However, they do not attain the accuracy achieved by the present invention.

Some early pioneer works are cited as examples from the voluminous literature on characterizing semiconductor heterostructures, mostly on the basis of photoluminescence, and as a further example of an analysis method:
1. "Festkörperprobleme" [Advances in Solid State Physics], vol. XV (1975), p. 21., Dingle, R.: "Confined Carrier Quantum States in Ultrathin Semiconductor Heterostructures";
2. Reviews of Modern Physics, 54 (1982), p. 437. Ando, T.; Fowler, A. B.; Stem, F.: "Electronic properties of two-dimensional systems."

These two references are also incorporated by reference herein.

The experimental data ascertained from the "photoluminescence" analysis method are evaluated, for example, by simulating photoluminescence spectra, as described by the following article, which is also incorporated by reference herein:
IEEE J. Quantum Electron., 26(1990), p. 2025. Jonsson, B.; Eng, S. T.: "Solving the Schrödinger Equation in Arbitrary Quantum-Well Potential Profiles Using the Transfer Matrix Method".

SUMMARY OF THE INVENTION

The present invention is directed to the calibration of a spacial scale (spatial coordinates) of technical devices, which work on the basis of high-resolution and ultrahigh-resolution imaging processes. These are imaging processes based on particle flows, such as scanning electron microscopy, scanning transmission electron microscopy, or scanning probe microscopy (atomic force microscopy, scanning tunneling microscopy).

The technical task at hand is to manufacture and calibrate a scale which will enable the technical devices mentioned above to be calibrated with very high precision. The invention achieves this objective by enabling scales to be manufactured and calibrated in the nanometer range.

More particulary, the present invention provides a method for manufacturing and calibrating a scale in the nanometer range for technical devices which are used for the high-resolution or ultrahigh-resolution imaging of structures characterized in that:

a to construct the scale, at least two different crystalline or amorphous materials are used for the heterolayer structure, which are easily distinguished from one another by their contrast when they are imaged using high-resolution or ultrahigh-resolution imaging methods; that b the different crystalline or amorphous material layers used are deposited by means of a material deposition method in the deposition direction, one after another in alternating sequence onto a substrate material, as a heterolayer sequence, until the entire layered stack is obtained; that c the heterolayer sequence is characterized experimentally using an analysis method that is sensitive to the layer thicknesses of the heterolayer sequence, the applied analysis method being independent of the high-resolution or ultrahigh-resolution imaging methods used in the technical devices for which the scale is manufactured; that d the experimental data obtained from the analysis method are evaluated and recorded, to make it possible to define the spacings between equivalent hetero-interfaces; and that e subsequently, right after the step according to point b or the step according to point c, the heterolayer structure of the various materials is exposed by splitting open the heterolayer sequence in the deposition direction.

DETAILED DESCRIPTION

Figure 1:
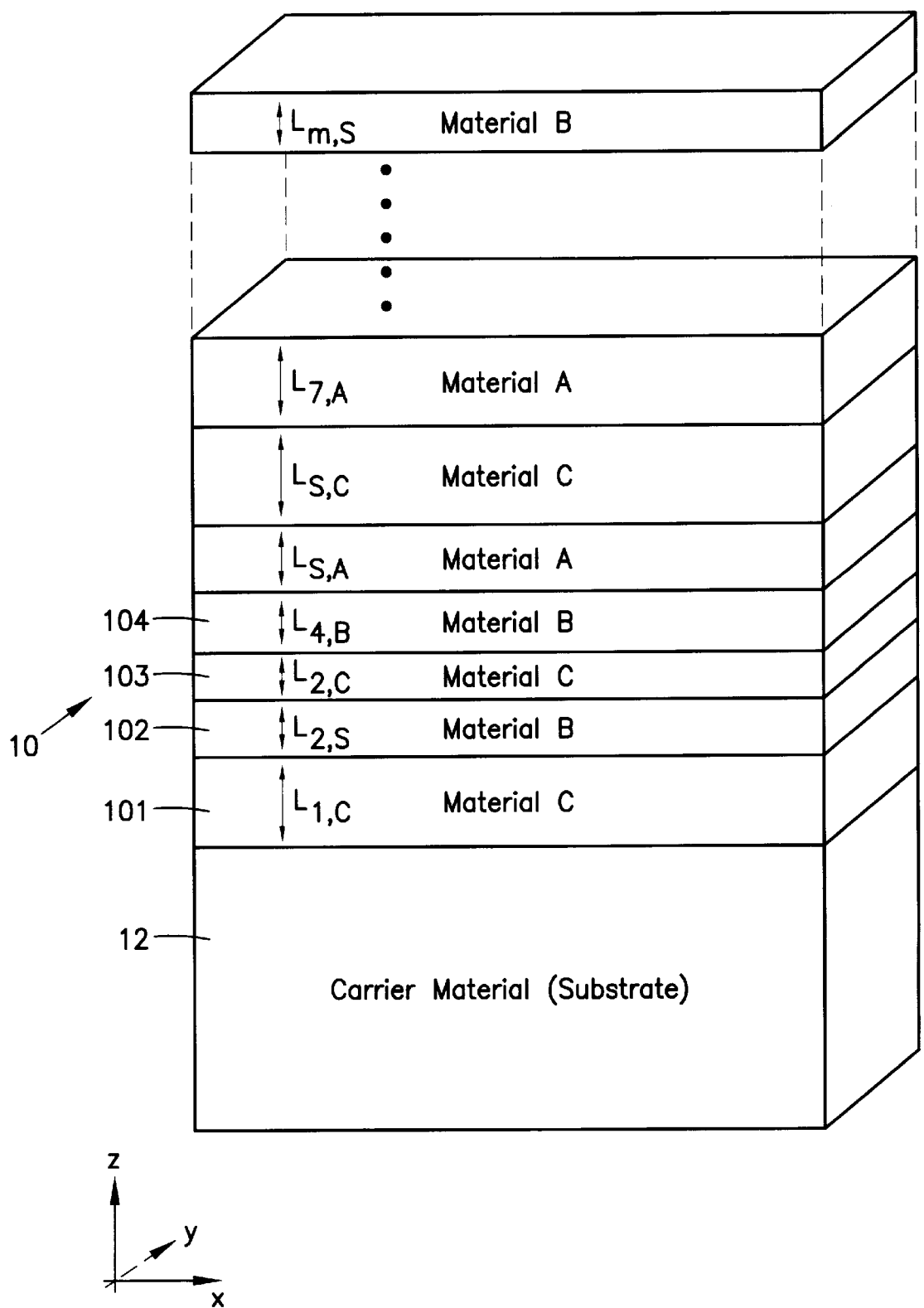
FIG. 1 shows a scale constructed from various materials according to the present invention.

The method in accordance with the present invention is directed to the manufacturing and calibrating of a scale in the nanometer range. To construct the scale, at least two different crystalline or amorphous materials (e.g., material A, B, and C, etc.) are used in accordance with the present invention, as shown in FIG. 1 and step 102 of FIG. 5. The materials used differ particularly with respect to their compositions, making them easily distinguishable from one another by their contrast when they are imaged using high-resolution or ultrahigh-resolution imaging methods. In the following, z denotes the deposition direction of the deposition process (vertical direction). The interfaces of the heterolayer structure lie parallel to the xy-plane (lateral directions). The scale 10 has m layers, identified generally as 101, 102, 103, 104, etc., formed on a substrate 12. The layers have thicknesses L.

Figure 5:
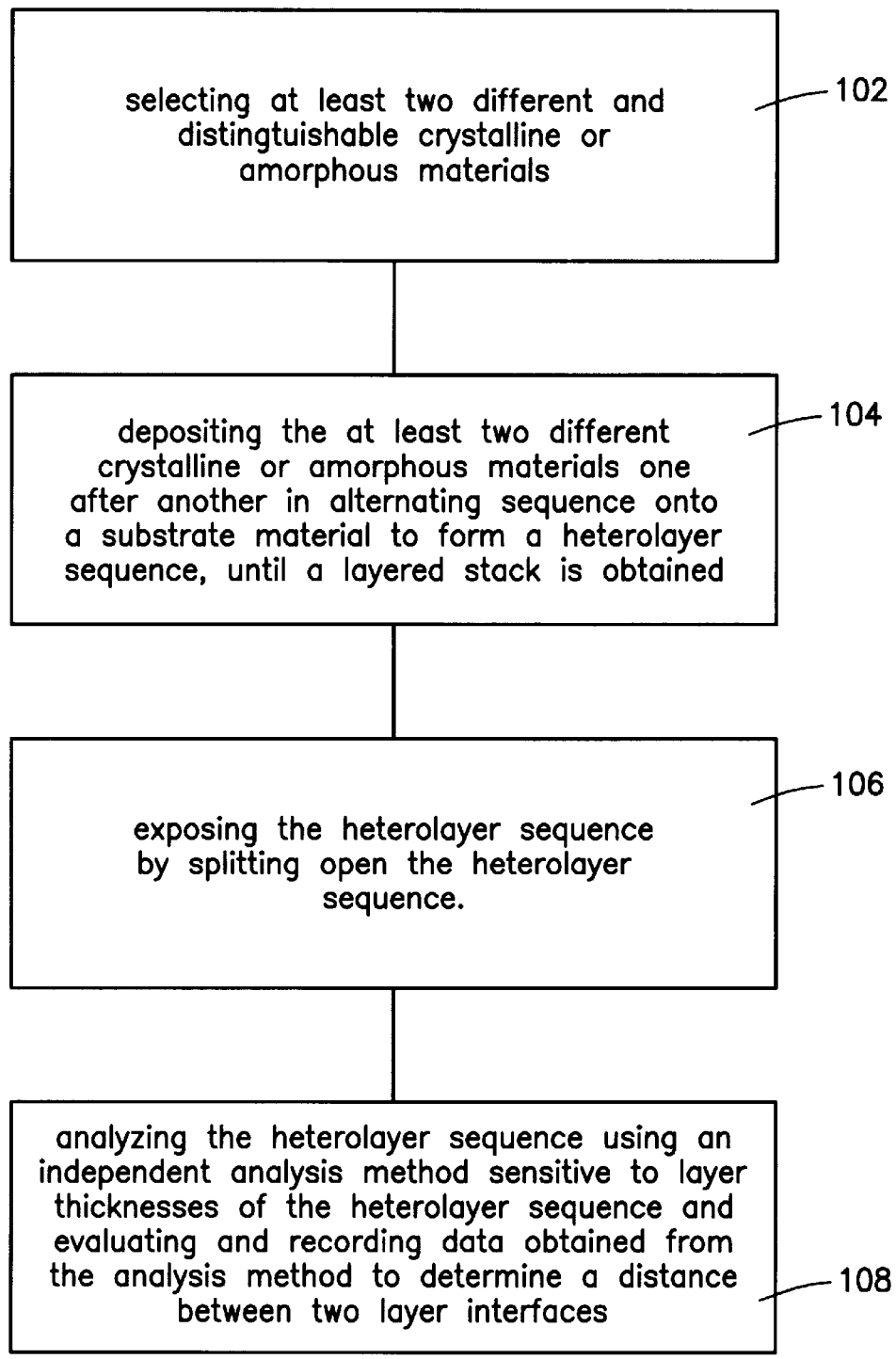
FIG. 5 shows a flowchart of the method of the present invention

The different materials are deposited as thin layers on a substrate using a material deposition process (Step 104 of FIG. 5). Preferably, the deposition methods used are those which result in a best possible homogeneity of the heterolayer structure in all spatial directions with respect to composition and lattice mismatch of the individual layers. The heterolayer structure is deposited on the carrier material, for example a substrate, in the deposition direction, the different material layers being deposited one after another in alternating sequence on to the substrate as a heterolayer sequence, until the entire layered stack is obtained. The thickness of the individual layers lies in the nanometer range, preferably less than 25 nanometers. The thickness of the heterolayer sequence lies in the range of approximately 20–200 nanometers. In terms of process engineering, the object of the present invention is able to be realized, for example, by growing a heterolayer structure of thin semiconductor material layers on a substrate using epitaxial methods, such as molecular beam epitaxy, organometallic molecular beam epitaxy, or organometallic gas-phase epitaxy.

Following fabrication, the thus produced heterolayer sequence is characterized experimentally using at least one analysis method. (Step 108 of FIG. 5) The analysis method selected must be sensitive to the individual layer thicknesses of the heterolayer sequence and ensure a high degree of precision. The analysis method(s) must be independent of the high-resolution or ultrahigh-resolution imaging methods used in the technical device(s) to be calibrated. In connection with the X-ray diffractometry analysis method, it is especially expedient to produce a periodic, crystalline multi-layered structure (e.g. multiple quantum film structure) or a multiple layer having a superlattice structure. Important structural dimensions are in the case of the multi-layered structure the period thickness and, in the case of the superlattice structure, the superlattice period.

By evaluating the experimental data obtained from the analysis method(s), the period thickness of the heterolayer sequence, for example, or the individual layers of the heterolayer sequence are determined and recorded, so that the spacings between equivalent or non-equivalent interfaces can be defined.

If a periodic heterolayer structure was determined from the materials A and B, then every second hetero-interface is an equivalent hetero-interface, whereas two adjacent hetero-interfaces are non-equivalent.

Before or after evaluating the experimental data obtained from the analysis method(s), the layer structure of the different crystalline or amorphous materials is revealed by separating the produced heterolayer sequence in the deposition direction. (Step 106 of FIG. 5). If a crystalline heterolayer structure is revealed, it can be cleaved, for example, along the crystal planes which show the deposition direction. The cleaving along the crystal planes can take place once the process of depositing the various materials onto the substrate is complete. Other methods for revealing and exposing the heterolayer structure comprise etching and oblique grinding.

The heterolayer sequence is able to be experimentally characterized, i.e., the thickness of some or all of the individual layers is able to be determined through physical analysis methods, such as X-ray diffractometry or photoluminescence.

If X-ray diffractometry is used to analyze, e.g., a crystalline, periodic heterolayer structure, then the accuracy that is attainable in sizing the scale to be manufactured rises with the number of layers deposited on the substrate. The accuracy is further increased by using simulation programs with model calculations to additionally simulate the experimental results of the analysis methods (e.g., X-ray diffractometry).

To enhance the material contrast of the individual thin layers to make the layers distinguishable from one another, appropriate methods, such as chemical etching are applied, as needed.

With the method according to the present invention, one attains a calibrated scale in conjunction with a documented size determination of the heterolayer sequence of the scale. On the basis of these two components, it is possible to calibrate technical devices used for the high-resolution or ultrahigh-resolution imaging of structures.

Exemplary Embodiments

The method according to the invention will be elucidated further on the basis of two exemplary embodiments.

Figure 2:
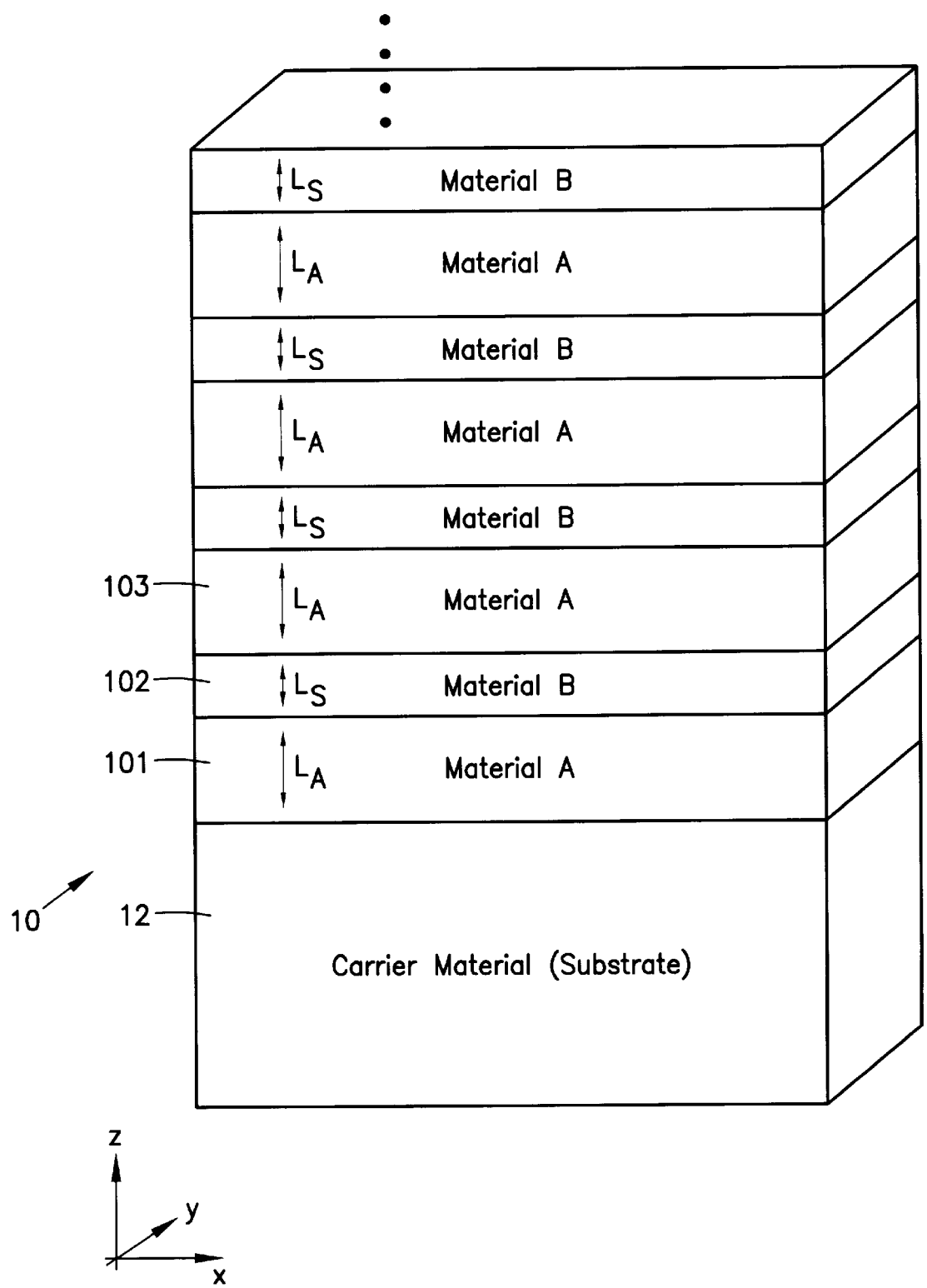
FIG. 2 shows a scale constructed from two heterogeneous materials A and B according to the present invention.

In both exemplary embodiments, monocrystalline semiconductor heterostructures are produced with high local precision in all spatial directions using a suitable epitaxial method. The heterolayer stack being used as a scale is comprised, as illustrated in FIG. 2, of a periodic sequence of semiconductor layers of the alternating layer sequences ABABAB having the corresponding layer thicknesses $L_A$ and $L_B$. The scale 10 in FIG. 2 has layers, identified generally as 101, 102, 103, etc., formed on a substrate 12.

Exemplary Embodiment 1 (Crystalline, Periodic Semiconductor Structure; Analysis Method: X-ray Diffractometry)

In determining the period length $(L_A+L_B)$ in accordance with the invention, five marginal conditions have to be met:

The epitaxial semiconductor materials A and B must differ substantially in their lattice constants in the direction of growth. This can be achieved through a selective, different strain in layers A and B in relation to the substrate using modern epitaxial methods.

The monocrystalline, vertical semiconductor heterostructure must be as constant as possible parallel to the direction of growth (xy plane) in the layer thickness $(L_A+L_B)$ within the scope of physically unavoidable fluctuations in the atomic single-layer range. This homogeneity can be reached using present-day epitaxial methods.

There should be an adequate number of periods n of the layer thickness $(L_A+L_B)$ in the structure. The number n of the periods thereby determines the accuracy of the scale, which can be achieved in evaluating the experimental results of the analysis method.

The net strain in the heterolayer sequence of n periods of the period length $(L_A+L_B)$ should be as small as possible in order to rule out stress relaxation in the entire layer sequence.

The material used must be one for which an appropriate method exists for exposing the heterolayer sequence.

The material system selected must produce sufficient contrast in the high-resolution or ultrahigh-resolution imaging method being used.

The semiconductor material system, aluminum gallium indium-arsenide on indium phosphide (AlGaInAs on InP), selected for the present exemplary embodiment and produced using the epitaxial method of molecular-beam epitaxy, satisfies these conditions. Layer sequences of n periods of the period length ($L_A$ and $L_B$) were produced by subjecting layer A to a pressure (compressive) strain of about 0.3% to 3% compared to the substrate InP, and by subjecting the second layer B to tensile strain of about 0.3% to 3% compared to the substrate.

By this means, one obtains, on the one hand, a greatly varying lattice constant in the two materials A and B; on the other hand, the net strain of the epitaxial layer sequence becomes roughly 0 when the following condition is fulfilled: the degree of strain of layer A multiplied by its thickness is equal to the degree of strain of layer B multiplied by its thickness. In the material system in the present example, the degree of strain is mainly produced by varying the concentration levels of In, the contrast mainly by varying the concentration levels of Al in the A and B layers.

To reveal the produced heterolayer sequence $n(L_A+L_B)$, it is split along certain crystal planes, the crystal planes being formed lying, for example, parallel to the direction of growth.

Another method for baring the heterolayer sequence consists in grinding the produced heterolayer sequence obliquely at a defined angle. The angle should be selected so as to ensure that the layers of the heterolayer sequence are distinguished from one another as best possible.

In the two variants described, the contrast can be further enhanced, on the one hand, through a slight etching of the cleaved plane using a wet chemical etching solution, which attacks the materials A and B differently and, on the other hand, with the aid of commercially available image-processing software, which also intensify the material contrast in the technical devices used for high-resolution or ultrahigh-resolution imaging of structures.

To uncover the heterolayer structure, it is also possible to etch trenches into the heterolayer stack opposite the deposition direction, it being necessary for the trench depth to be greater than the overall thickness of the heterolayer stack.

Another possibility for revealing the heterolayer structure consists in etching islands into the heterolayer stack. In this case, the material removed opposite the deposition direction must likewise be greater than the overall thickness of the heterolayer stack.

Figure 3:
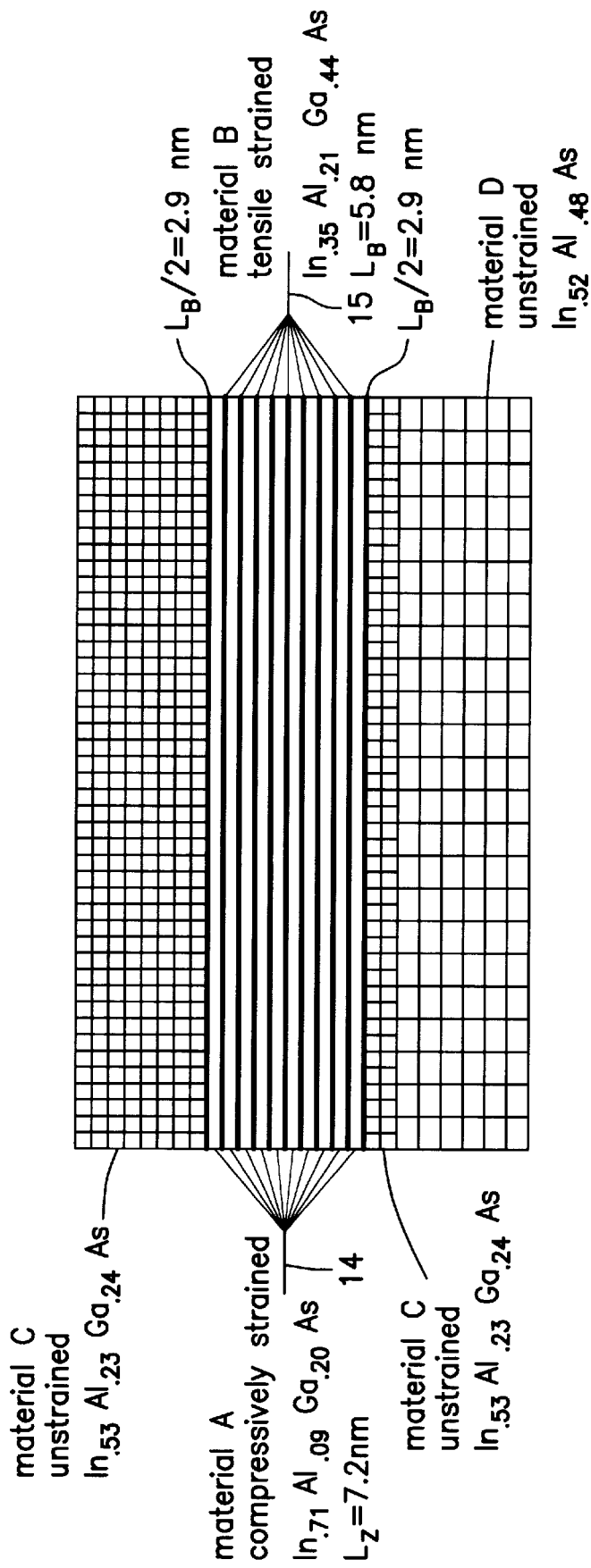
FIG. 3 shows an example of a scale made in accordance with the present invention.

FIG. 3 shows a schematic, cross-sectional representation of a semiconductor heterolayer sequence suitable as a calibrated scale 10, having layers 14 (white) of material A and layers 15 of material B (black). The compositions as well as the dimensions of the individual layers are reproduced alongside the drawing. The structure has n=10 periods of the thickness $L_A+L_B$. The strain in the material with the smaller band gap amounts to $\Delta a/a=+1.2\%$, the strain in the material with the larger band gap amounts to $\Delta a/a=-1.4\%$.

Figure 4:
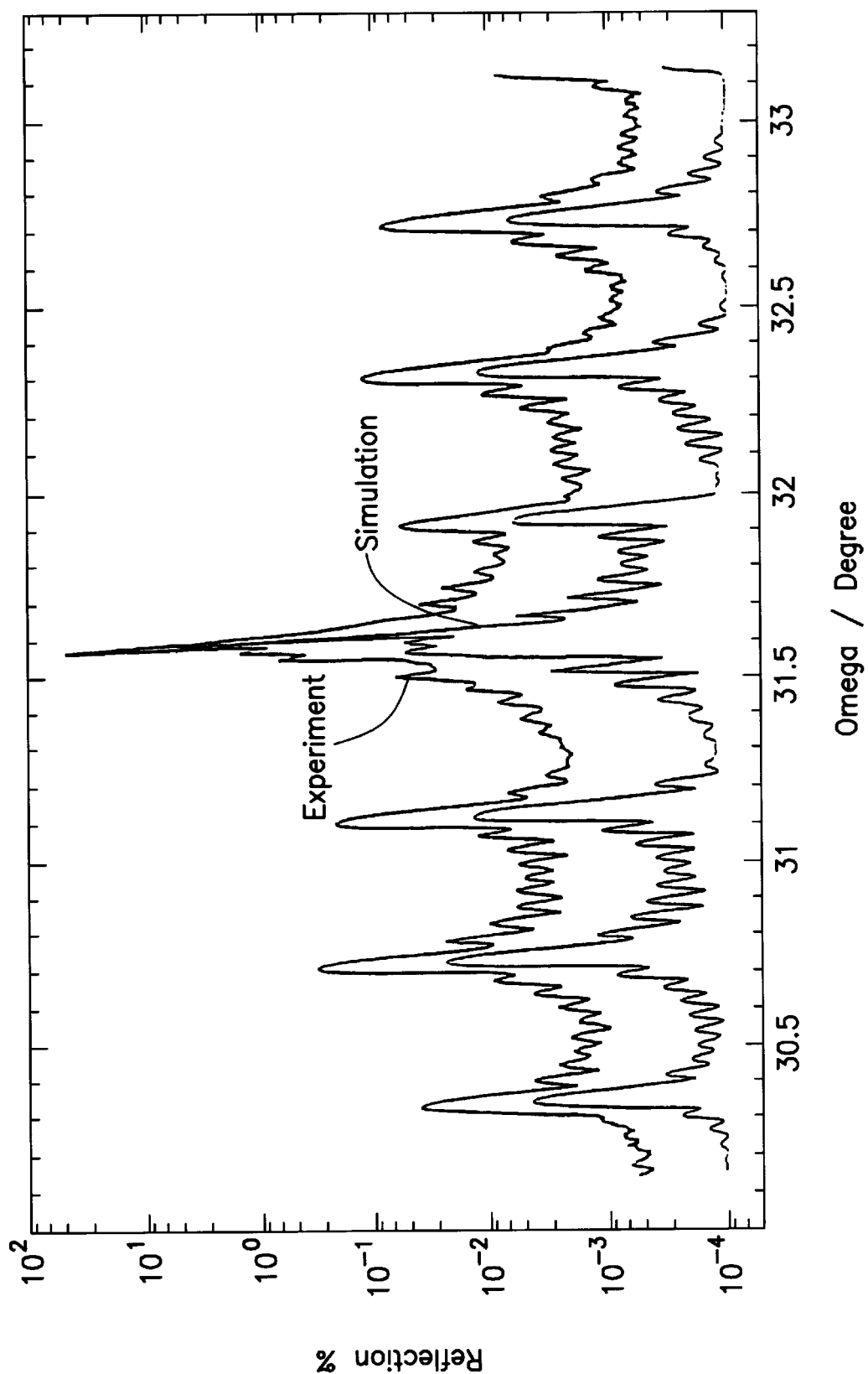
FIG. 4 shows experimental data and simulation or model data showing the reflection at various degrees for a scale made in accordance with the present invention. The simulation or model data is moved downward from its actual position to show its correspondence with the experimental data.

The accuracy of the thickness determination of the occurring period $(L_A+L_B)$ depends essentially on the measuring accuracy of the analysis method used in this example, on the X-ray diffractometry, and on the accuracy with which the physical parameters used in the model calculation (simulation) are known. Measured X-ray diffractometry spectra are thereby compared to mathematically simulated spectra (FIG. 4). The simulated curve is shifted to the bottom in this case for clarification purposes. The simulated spectra can be thereby adapted so precisely to the measured spectra that the errors in the mathematical result for the period of the exemplary embodiment in FIG. 3 ($L_A+L_B=13.0$ nm) lie below 0.1 nm. This means a relative error in the thickness determination of <0.8%.

Exemplary Embodiment 2 (Crystalline, Periodic Semiconductor Structure; Analysis Methods; X-ray Diffractometry and Photoluminescence With respect to the means in accordance with the invention for determining the period $(L_A+L_B)$, as well as, additionally, the individual thicknesses ($L_A$ and $L_B$) in accordance with exemplary embodiment 2, two marginal conditions must be met in addition to those specified in exemplary embodiment 1:

The materials must have different band gaps.

Of the epitaxially produced semiconductor materials, the one with less band-edge energy must exhibit a direct band gap.

The semiconductor material system AlGaInAs on InP selected for the present exemplary embodiment also satisfies these conditions when the right composition parameters are chosen. Within the scope of this second exemplary embodiment, two layer sequences are produced with the structure $n(L_A+L_B)$ and $n(L_A+xL_B)$, $L_A$ being assigned to the layer with less band edge energy that is retained in both layer sequences, while $L_B$ and $xL_B$ are assigned to the layers with greater band edge energy, which were intentionally selected to vary in thickness. The parameter x expresses the difference in the thickness, which amounts, for example, to x=3/2. In this case, the spectral emission signal must not be a function of the variation in the layer thickness of $L_B$ for $x \cdot L_B$ ($L_B$ must be selected to be large enough). The two semiconductor layer sequences are evaluated, as described under exemplary embodiment 1, with the aid of X-ray diffractometry. To ensure that $L_A$ has the same thickness in the two different layer sequences, the emission wavelength characteristic of $L_A$, given a certain material composition, is determined with the aid of photoluminescence. Given an identical emission wavelength in the photoluminescence spectrum and, thus, identical $L_A$, two equations are able to be formulated and solved, together with the measuring results of the X-ray diffractometry, with two unknowns, $L_A$ and $L_B$. Apart from that, all particulars given under the first exemplary embodiment apply, inclusive of the error estimation.

Instead of characterizing by photoluminescence, it is likewise possible to analyze by photoreflection, absorption, or transmission, for example.

When calibrating the microscope using the means set forth by the invention, it is preferable to have the greatest possible number of periods n of layer sequences A and B, to minimize reading errors.

What is claimed is:

1. A method for manufacturing a scale in the nanometer range for technical devices which are used for high-resolution or ultrahigh-resolution imaging of structures, the method comprising the steps of:

selecting at least two different crystalline or amorphous materials, which are distinguishable from one another when they are imaged using high-resolution or ultrahigh-resolution imaging methods;

depositing the at least two different crystalline or amorphous materials one after another in alternating sequence onto a substrate material to form a heterolayer sequence, until a layered stack is obtained;

analyzing experimentally the heterolayer sequence using an applied analysis method that is sensitive to layer thicknesses of the heterolayer sequence, the applied analysis method being independent of the high-resolution or ultrahigh-resolution imaging methods used in the technical devices for which the scale is manufactured;

evaluating and recording data obtained from the applied analysis method, the data enabling determination of a distance between equivalent hetero-interfaces; and after the depositing step and before the evaluating and recording data step, exposing the heterolayer sequence by splitting open the heterolayer sequence.

2. The method as recited in claim 1 wherein the depositing step results in the layered stack having a homogeneous thickness and composition in directions perpendicular to the deposition direction and results in similar thicknesses for layers having a similar material composition.

3. The method as recited in claim 1 wherein a thickness of at least one individual layer of the heterolayer sequence is less than twenty-five nanometers.

4. The method as recited in claim 1 further comprising the step of using an additional analysis method to analyze the heterolayer sequence to permit ascertainment of a distance between non-equivalent hetero-interfaces of the heterolayer sequence as well.

5. The method as recited in claim 4 further comprising the step of analyzing the heterolayer sequence with the aid of a simulation model.

6. The method as recited in claim 1 further comprising the step of analyzing the heterolayer sequence with the aid of a simulation model.

7. The method as recited in claim 1 further comprising the step of determining the period thickness of the heterolayer sequence.

8. The method as recited in claim 1 further comprising the step of determining thicknesses of individual layers of the heterolayer sequence.

9. The method as recited in claim 4 further comprising the step of determining the thickness of an individual layer of the heterolayer sequence.

10. The method as recited in claim 1 wherein the heterolayer sequence forms a superlattice structure.

11. The method as recited in claim 1 wherein the depositing step uses epitaxial methods and that at least two layers of the heterolayer sequence next to each other have a different strain.

12. The method as recited in claim 1 wherein in the selecting step two different materials A and B are selected so that the heterolayer sequence comprises material layers A and material layers B, and that during the depositing step the material layers A are deposited so as to have a compressive strain relative to the substrate material, and the material layers B to have a tensile strain relative to the substrate material, a net crystalline strain of heterolayer sequence roughly approaching zero.

13. The method as recited in claim 1 wherein a varying strain is introduced into different layers of the heterolayer sequence by altering the chemical composition of the at least two different crystalline or amorphous materials.

14. The method as recited in claim 1 wherein the heterolayer sequence is split open along a deposition direction.

15. The method as recited in claim 1 wherein the exposing step comprises grinding the layered stack obliquely at a defined angle.

16. The method as recited in claim 1 wherein the exposing step comprises etching trenches into the layered stack, a trench depth being greater than an overall thickness of the layered stack.

17. The method as recited in claim 1 wherein the exposing step comprises etching islands into the layered stack.

18. The method as recited in claim 1 further comprising the step of enhancing the contrast between layers of the heterolayer sequence by using a wet chemical etching solution.

19. The method as recited in claim 1 wherein two of the at least two different crystalline or amorphous materials have different band gaps, the material having less band-edge energy exhibiting a direct band gap.

20. The method as recited in claim 1 wherein the applied analysis method uses at least one of an X-ray diffractometry process and a photoluminescence process.

21. The method as recited in claim 1 wherein:

the at least two different crystalline or amorphous materials are selected such that they differ substantially in their lattice constants in a direction of the depositing and at least two adjacent layers of the heterolayer sequence have a different strain; and the heterolayer sequence is essentially homogeneous parallel to the direction of the depositing in a period layer thickness.

22. The method as recited in claim 1 further comprising the step of enhancing the contrast between layers of the heterolayer sequence by using image-processing software.

23. The method as recited in claim 1 wherein layer thicknesses of the heterolayer sequence are determined using X-ray diffractometry, and further comprising the step of comparing measured X-ray diffractometry spectra to arithmetically simulated spectra so that the arithmetically simulated spectra have a relative error for thickness determination under 1%.

24. A method for manufacturing a scale in the nanometer range for technical devices which are used for high-resolution or ultrahigh-resolution imaging of structures, the method comprising the steps of:

depositing a plurality of crystalline or amorphous first material layers having a first thickness and a plurality of second material layers having a second thickness and which are distinguishable from the first material layers, the first and second layers being deposited in alternating sequence onto a substrate material to form a heterolayer sequence;

analyzing the heterolayer sequence using an analysis method that is sensitive to the first and second thicknesses, the analysis method being independent of the high-resolution or ultrahigh-resolution imaging methods used in the technical devices for which the scale is manufactured;

evaluating and recording data obtained from the analysis method, the data enabling determination of at least a sum of the first and second thicknesses; and after the depositing step, exposing the heterolayer sequence by splitting open the heterolayer sequence.

25. The method as recited in claim 24 wherein the analysis method uses at least one of a x-ray diffractometry process and a simulation model.

26. The method as recited in claim 24 wherein:

the heterolayer sequence includes a first heterolayer sequence having a structure $n(L_A+L_B)$ and a second heterolayer sequence having a structure $n(L_A+X^* L_B)$, where X corresponds to a thickness difference, $L_A$ corresponds to a first layer and $L_B$ corresponds to a second layer;

the first layer $L_A$ is associated with a first band edge energy and the second layer $L_B$ is associated with a second band edge energy, the second band edge energy being greater than the first band edge energy; and the heterolayer sequence is analyzed using another applied analysis method to determine emission wavelength characteristics of the first layer $L_A$.

27. The method as recited in claim 24 further comprising the step of depositing a plurality of third material layers, so that the third material layers have a third thickness, the third thickness having a thickness x times the second thickness, x being a known quantity.

* * * * *